United States Patent

[11] 3,607,211

[72] Inventors Edward L. Cole
 Fishkill;
 Howard V. Hess, Glenham, both of N.Y.
[21] Appl. No. 883,339
[22] Filed Dec. 8, 1969
[45] Patented Sept. 21, 1971
[73] Assignee Texaco Inc.
 New York, N.Y.

[54] SOIL MICRONUTRIENT PRODUCT
 15 Claims, No Drawings
[52] U.S. Cl. ........................................................ 71/1, 71/24,
 252/445, 252/447, 260/82
[51] Int. Cl. ........................................................ C05f 11/02
[50] Field of Search ............................................. 71/1, 23,
 24, 11; 200/82; 252/447, 445

[56] References Cited
 UNITED STATES PATENTS
 2,171,408  8/1939  Smit ............................. 71/24 X
 2,471,213  5/1949  Higgins ........................ 71/1 X Primary Examiner—Reuben Friedman
Assistant Examiner—Richard Barnes
Attorneys—Thomas H. Whaley and Carl G. Ries ABSTRACT: A soil micronutrient product prepared from petroleum coke by oxidizing said coke with oxygen in the presence of water followed by contacting with a metal or ammonium containing cation solution to produce a family of cation exchanged derivatives of oxidized coke. The products of the invention may be used as a plant mulch, a soil conditioner, a source of carbon and trace elements for soil micro-organisms, petroleum catalyst and as a low cost ion-exchange resin.

SOIL MICRONUTRIENT PRODUCT

This invention relates to a metal containing petroleum coke and more particularly to a cationic petroleum coke prepared by oxidizing a petroleum coke in the presence of water.

Soil for rapidly growing high yield crops may require fertilization or structural improvement or both depending upon the specific crop or soil. Commercially available inorganic fertilizers generally provide only the so-called primary elements—nitrogen, phosphorus, and potassium, or the secondary elements—calcium, magnesium, and sulfur. Being water-soluble, such fertilizers are easily leached from the soil; and, they do little to improve the soil tilth. Furthermore, they must be supplemented with organic fertilizer and certain trace elements such as copper, iron, manganese, zinc, cobalt, molybdenum, and boron. These trace elements are called micronutrients because of the relatively small amounts required by plants for healthy growth. Organic fertilizers are necessary as a source of food for energy, growth, and reproduction of soil micro-organisms.

When a soil is deficient in any micronutrient, crop yields are bound to suffer. The supply of nutrients in the soil is affected by the parent material from which the soil was derived, along with such things as erosion, leveling, leaching, and removal of trace elements through crop yields. Soil types characterized by micronutrient shortages and inferior structure include sand, muck, and peat. Thus for example, 0.04 pound of copper, 0.10 pound of zinc, and 0.76 pound of manganese are necessary to support the healthy growth of 3,000 pounds of tobacco.

A particular problem associated with the supply of trace elements to the soil is the necessity to have sufficient capacity for the trace elements wherein such trace elements are released to the soil continuously over a period of time. Thus a soil micronutrient which loses the trace elements through for example leaching at an extremely fast rate cannot provide the slow release of nutrients which is needed in order to properly maintain good crop growth and yields.

It is therefore an object of this invention to provide a micronutrient which can provide trace elements to the soil continuously over a long period of time.

It is a further object of this invention to provide a cation exchanged coke which can be produced in good yields and with sufficient cation capacity to be utilized as a micronutrient.

It has now been found that a micronutrient product which is useful for supplying trace elements to various crops can be prepared by the process which comprises the steps of (1) oxidizing a petroleum coke with oxygen in the presence of water and (2) contacting the product from step (1) or the alkali metal salt thereof with a cation selected from the group consisting of copper, iron, magnesium, molybdenum, manganese, zinc, ammonium, cobalt and mixtures thereof. In addition it has been discovered that such micronutrient products are capable of preparation by the contacting of the oxidized petroleum coke with a cation as set forth above directly without necessity of prior treatment of the oxidized coke with for example an alkali metal cation. However it is contemplated within the scope of this invention that the oxidized petroleum coke can be converted to the alkali metal salt such as the sodium salt followed by contacting with the various cations such as copper, zinc and iron which are set forth above. In addition the products of this invention have excellent exchange capacity and can be produced in good yields especially when compared to a product which is produced by the oxidation of petroleum coke by direct oxidation with for example air in the absence of water. Also, the products of this invention resist leaching especially when compared to a petroleum coke which has adsorbed thereon various metal cations.

It is contemplated within the scope of this invention that an improved method for supplying trace elements to crops can be accomplished by a method which comprises contacting a crop with a micronutrient amount of a product as set forth above. Included within such method is the contacting of a crop with a fertilizer composition comprising a fertilizer and a micronutrient amount of the product of this invention which fertilizer compositions have been found to exhibit a reduced tendency to cake.

Thus these new micronutrient fertilizer products of this invention are water stable and slowly ionize or react in the soil to release trace elements which are vital to plant life. In addition, the products of this invention may be used to improve the structure of poor soils such as soil aggregation, porosity, air permeability, water infiltration, and soil tilth. Furthermore, the product can help to prevent soil crusting and compaction; and may be used as a plant mulch. As a source of energy for microbiological activity they can increase the development of bacteria, fungus, and other micro-organisms in the soil which micro-organisms are active in soil processes and are essential to healthy plant growth. They excrete enzymes that decompose plant residue and organic matter, oxidize ammonia, fix nitrogen, digest protein, and synthesize new organic compounds. The new micronutrient fertilizers have a marked buffering effect by reducing damage to plant roots from excessive acids, alkalis, or salts, In addition, the products of this invention are useful as a low cost ion-exchange resin in such applications as hydroponics or soilless agriculture.

To prepare the products of the present invention, petroleum coke is oxidized with oxygen in the presence of water to produce an intermediary product (oxidized petroleum coke) or optionally the alkali metal derivative thereof which product is then treated with an aqueous solution containing the desired cation to form the cation exchanged petroleum coke. Various cation exchange resins prepared by this process may be blended to meet the nutrient requirements of a specific crop on a specific soil, or for pH control. Micronutrient cations are in general believed to be attached to oxidized coke by replacing the H ion in one or more carboxyl groups or by chelation. In a similar manner, additional nitrogen may be added to the oxidized coke by treating said oxidized coke with a dilute aqueous solution of ammonium hydroxide or ammonium chloride. Furthermore, a multiion exchange resin may be prepared by treating a single batch of oxidized petroleum coke in successive steps with different cation solutions, or in one step with a solution containing mixed cations. By controlling the type and quantity of ions added to the oxidized coke, ion exchange resins may be prepared which will release in the soil controlled amounts of specific micronutrients over long periods of time. This prevents high dosages of trace elements which might otherwise burn the crop. Furthermore, it has been found that rain has a reduced tendency to leach these metal coke products from the soil.

The black body character of cationic petroleum coke increases the absorptivity of the soil for solar radiation by as much as 40 percent, and makes possible a ground temperature increase of 10°–20° F. Carbon in cationic petroleum coke may be utilized by heterotrophic and autotrophic micro-organisms in the soil as a source of energy for biochemical transformations. In addition, the trace elements supplied by the cationic coke favorably influence catalytic effects within the cell, cell membrane structure and permeability, and other phases of the physiology of bacteria. Heterotrophics include both gram negative and gram positive bacteria as well as spore formers and many fungi and actinomycetes. The two autotrophic genera prominent in soil nitrification are Nitrosomonas and Nitrobacter. The former function as ammonia oxidizers and the latter as nitrite oxidizers.

By means of ion exchange reactions in the soil, the cations of metal coke products can be released for absorption by either micro-organisms or plants during their metabolic processes. The exchangeable cations may pass into the soil through exchange with H-ions from dilute acids formed in the soil by biological processes or introduced as constituents of rain water or commercial fertilizer. Furthermore, the exchangeable cations may be replaced by other cations already in the soil in accordance with the lyotropic series which follows in order of replacing power: lithium < sodium < potassium < cesium < magnesium < calcium < strontium < barium < aluminum.

In another theory, it is postulated that the metal coke products directly contacting plant root surfaces exchange coke cations for the H-ions which are part of the protein in the plant root. Thus, the coke cations are directly absorbed by the plant root without passing through an intermediate solution stage.

Petroleum coke is comprised of minute graphitelike crystals imbedded in an organic matrix of highly condensed aromatic compounds such as anthracene, phenanthracene, chrysene, picene and crakene.

The petroleum coke used as a starting material in the process of this invention can be produced by the "delayed coking" process—a special process for converting heavy residual fuel oil into gasoline, gas oil, and coke. Other petroleum coking processes may be used if they produce a petroleum coke having a similar structure and chemical analysis. In the "delayed coking" process, reduced crude oil is charged into the base of a fractionating tower. Tower bottoms and a predetermined recycle stream are withdrawn and heated to a temperature of 900°–950° F. By delayed residence in a coke drum, the petroleum coke builds up at a temperature of 850°–900° F. and a pressure of 10–100 p.s.i. The petroleum coke is then cooled with water and removed from the delayed coker by hydraulic jet. The coke particles are quite hard and abrasive, and may contain sufficient oils to make them "tacky." Existing petroleum coke plants vary in size from small units producing 75 tons per day to large multiple tower plants producing and handling as much as 1,500 tons per day. Petroleum coke generally has the following composition by weight: from about 0 to about 0.5 percent moisture, from about 1 to about 15 percent volatiles, from about 85 to about 95 percent fixed carbon, from about 0.2 to about 1.3 percent ash, and from about 1 to about 5 percent sulfur.

The oxidized coke intermediate is in general prepared by contacting the petroleum coke with oxygen, including air and activated oxygen, preferably air, in the presence of water including compounds which generate water during the course of the reaction, in general at temperatures of from about 600° F. to about 1,000° F. more preferably from about 650° F. to about 850° F., at pressures of from about atmospheric to about 100 p.s.i.g. more preferably from about atmospheric to about 10 p.s.i.g. It is preferred in carrying out the oxidation step to utilize air wherein the air is saturated with water at a saturation temperature of from about 50 to about 210° F. more preferably from about 100 to about 180° F. In general the concentration of water which is utilized in carrying out the process of this invention is dependent upon the gas rate which is utilized during the oxidation step. Thus concentrations of water in the oxygen containing gas is in general from about 0.04 weight percent to about 70 weight percent more preferably from about 0.05 weight percent to about 40 weight percent. The hourly gas rate which is utilized including both air and water that is saturated air is in general from about 0.25 to about 0.75 more preferably from about 0.40 to about 0.60 based upon the weight of the petroleum coke. The treating time will be from 1 to 30 hours and more preferably from 4 to 12 hours at the above gas rates. In general the yields which are obtained upon oxidation of the petroleum coke are at least about 50 percent more preferably from about 70 to 90 percent by weight. It is contemplated within the scope of this invention that the oxidation of petroleum coke can be carried out in the presence of a catalyst such as a vanadium catalyst. However it is preferred to carry out such oxidation in the absence of a catalyst although the use of the term "oxidizing a petroleum coke" includes both the oxidation in the presence and absence of a catalyst.

The exchange capacity of the oxidized petroleum coke expressed as milliequivalents per gram of oxidized coke is represented by the sum of the weak acid and chelating sites.

The number of carboxyl groups in the oxidized coke may be determined by passing a 1N $(CH_3COO)_2$ Ca solution over the oxidized coke followed by titrating the filtrate with 0.1N KOH solution.

The cation exchange derivative of oxidized petroleum coke may be made by contacting the coke with the desired cations in an amount sufficient to combine from about 0.05 to about 5 percent by weight more preferably from about 0.1 to about 2 weight percent and still more preferably from about 0.1 to about 1.0 weight percent. In addition the amount of cation incorporated into the oxidized petroleum coke based upon milliequivalents per hundred grams of product is preferably from about 1 to about 150 more preferably from about 5 to about 50. This is preferably accomplished by shaking washed oxidized petroleum coke with dilute cationic solutions, e.g. 0.01–5 molar of the desired cations in distilled water for 1 hour to about 16 hours, allowing the mixture to settle, and then filtering. To prevent unwanted ions in the product, it is preferred to prepare the dilute cationic exchange solutions from distilled water. However, pure municipal and natural water of low cation content or deionized water may be also used. Treatment with one or more dilute cationic solutions may be necessary to exchange the desired quantity and type of cations.

The cation exchange may be accomplished in an alternate manner by first neutralizing the oxidized petroleum coke with the oxides, hydroxides, bicarbonates, or carbonates of an alkali metal, alkaline earth metal, or ammonium (for example, sodium or ammonium hydroxide solutions) before treating it with the dilute salt solutions of the desired cation. By neutralizing with ammonium hydroxide, additional nitrogen in the form of ammonia may be added to the oxidized petroleum coke. The resulting ammoniated product may be also used for controlling the pH of acid soils.

The cationic petroleum coke fertilizers of this invention have been found not to segregate in storage. They may be uniformly applied to the soil separately as single cationic cokes, or as blended cationic cokes, or as multicationic cokes. They may be mixed with commercial superphosphate fertilizers and drilled into the soil prior to planting the seed; or they may be applied as top dressing after the seeds are planted. In addition, the cationic petroleum coke products were unexpectedly found to be hydrophilic, permitting them to be sprayed onto the soil as particulate matter in a water emulsion of petroleum residua or in a water slurry. Herbicides, antinematode agents and other soil chemicals may be incorporated in such sprays.

The invention can be better appreciated by the following nonlimiting examples.

EXAMPLE I

To a reactor tube (¾-inch inner diameter by 16 inches in length) equipped with a diffusion disc at the bottom of said reactor tube, gas addition means at the bottom of said tube, exit means at the top of said tube and heating means is charged 30.5 grams of a delayed coke from California Crudes (30–60 mesh). The coke is obtained by solvent extracting a coke having the following properties:

| | |
|---|---|
| Sulfur, wt. % | 1.33 |
| Carbon, wt. % | 95.8 |
| Ash, wt. % | 0.71 |
| Hydrogen, wt. % | 4.01 |
| Nitrogen, wt. % | 2.4 |
| Nickel, wt. % | 0.03 |
| Vanadium, wt. % | 0.08 |
| Iron, wt. % | 0.023 | with toluene for 18 hours to remove oil soluble components. The petroleum coke after extraction is recovered in 99 percent yield and contains a 1.22 weight percent sulfur and 2.5 weight percent nitrogen. Air which is saturated with water at 100° F. is fed through the bottom gas addition means at a rate of 13.5 liters per hour at a temperature of 650° F. The temperature is maintained at 650° F. for a period of 12 hours. The product is reduced in temperature and an oxidized petroleum coke is recovered at a yield of 59.8 weight percent.

EXAMPLE II

To the reactor tube as described in example I is added 30.5 grams of delayed coke from California Crude, the properties of which are set forth in Example I. Air which is saturated with water at a temperature of 100° F. is introduced and continuously added to the coke at a rate of 13.5 liters per hour over a period of 12 hours while maintaining a temperature of 700° F. in the reactor. The temperature is reduced to ambient temperature and an oxidized coke is recovered in a yield of 55.5 weight percent.

EXAMPLE III

To the reactor tube as described in example I is added 30.5 grams of delayed coke from California Crude, the properties of which are set forth in Example I. Air which is saturated with water at a temperature of 100° F. is introduced and continuously added to the coke at a rate of 13.5 liters per hour over a period of 6 hours while maintaining a temperature of 750° F. in the reactor. The temperature is reduced to ambient temperature and an oxidized coke is recovered in a yield of 71 weight percent.

EXAMPLE IV

To the reactor tube as described in example I is added 30.5 grams of delayed coke from California Crude, the properties of which are set forth in Example I. Air which is saturated with water at a temperature of 100° F. is introduced and continuously added to the coke at a rate of 13.5 liters per hour over a period of 6 hours while maintaining a temperature of 775° F. in the reactor. The temperature is reduced to ambient temperature and an oxidized coke is recovered in a yield of 67.8 weight percent.

EXAMPLE V

To the reactor tube as described in example I is added 30.5 grams of delayed coke from California Crude, the properties of which are set forth in example I. Air which is saturated with water at a temperature of 160° F. is introduced and continuously added to the coke at a rate of 13.5 liters per hour over a period of 12 hours while maintaining a temperature of 750° F. in the reactor. The temperature is reduced to ambient temperature and an oxidized coke is recovered in a yield of 85.2 weight percent.

EXAMPLE VI

To the reactor tube as described in example I is added 30.5 grams of delayed coke from California Crude, the properties of which are set forth in example I. Air which is saturated with water at a temperature of 160° F. is introduced and continuously added to the coke at a rate of 13.5 liters per hour over a period of 26 hours while maintaining a temperature of 750° F. in the reactor. The temperature is reduced to ambient temperature and an oxidized coke is recovered in a yield of 77.2 weight percent.

EXAMPLE VII

To the reactor tube as described in example I is added 30.5 grams of delayed coke from California Crude the properties of which are set forth in example I. Air is introduced and continuously added to the coke at a rate of 13.5 liters per hour over a period of 6 hours while maintaining a temperature of 750° F. in the reactor. The temperature is reduced to ambient temperature and an oxidized coke is recovered in a yield of 79.4 percent.

EXAMPLE VIII

Example VII is repeated utilizing the same delayed coke as in example I except that the temperature in the reactor was maintained at 850° F. An oxidized coke is recovered in a yield of 53.8 percent.

EXAMPLE IX

To the oxidized coke of example I (10 grams) is added an aqueous solution containing 1 percent by weight of zinc chloride. The mixture is shaken for 16 hours and allowed to stand for additional one-half hour at ambient temperature after which the cation exchanged product is recovered by filtration. The filter cake is washed with six 50-milliliter portions of distilled water and dried on a steam plate. The final wash was free of anion, chloride ion. A cationic petroleum coke is recovered which contains 0.59 weight percent zinc, 18 milliequivalents of zinc per 100 grams of product.

EXAMPLE X

In a similar manner as described in example IX the oxidized coke of example I is treated with a 1 percent aqueous solution of ferrous sulfate heptahydrate. A cationic petroleum coke is recovered which contains 1.03 weight percent iron, 36.9 milliequivalents of iron per 100 grams.

EXAMPLE XI

In a similar manner as described in example IX the oxidized coke of example I is treated with an aqueous solution containing 1 percent manganous sulfate tetrahydrate. A cationic petroleum coke is recovered which contains 0.09 weight percent manganese, 3.3 milliequivalents manganese per 100 grams product.

EXAMPLE XII

In a similar manner as described in example IX the oxidized coke of example I is treated with a 1 percent cupric sulfate pentahydrate aqueous solution. A cationic exchanged petroleum coke is recovered which contains 0.70 weight percent copper, 22 milliequivalents copper per 100 grams of product.

EXAMPLE XIII

In a similar manner as described in example IX the oxidized petroleum coke of example I is contacted with a 0.05 normal sodium hydroxide solution. A cationic petroleum coke is recovered which contains 1.53 weight percent sodium, 66.5 milliequivalents of sodium per 100 grams of product.

EXAMPLE XIV

To the oxidized coke of example VIII (10 grams) is added a cation solution containing 0.06 grams of ferric sulfate nonahydrate, 0.05 grams of cupric sulfate pentahydrate, 0.15 grams zinc sulfate heptahydrate in 200 milliliters of water. The mixture is stirred for a period of one hour at ambient temperature after which the solid cationic coke is washed five successive times with 200 milliliter portions of water. The cationic coke is dried on a steam plate and a cationic petroleum coke is recovered which contains 0.11 weight percent copper, 0.075 weight percent iron, 0.18 weight percent zinc.

EXAMPLE XV

In a similar manner as described in example IX the oxidized petroleum coke from example III is contacted with a 0.05 weight percent aqueous ammonium molybdate solution. A cationic petroleum coke is recovered which contains 0.036 weight percent molybdenum and a weight percent nitrogen of 4.9.

EXAMPLE XVI

In a similar manner as described in example XV the petroleum coke of example III is treated with a 1 percent by weight aqueous solution of cobaltous sulfate heptahydrate. A cationic petroleum coke was recovered which contains 0.15 weight percent cobalt, 5.1 milliequivalents cobalt per 100 grams of product.

EXAMPLE XVII

The petroleum coke as set forth in example I prior to oxidation is treated with a 1 percent aqueous copper sulfate pentahydrate solution for a period of 3 hours with stirring after which the solution is allowed to settle over a 24-hour period at ambient temperature. The mixture is filtered and the coke is washed with 35 parts by weight of water. The washing of the petroleum coke with 35 parts of water represents conditions which a micronutrient would be subjected to under actual conditions of rainfall. Thus in general a one-eighth inch of rainfall is equivalent to washing a micronutrient with 3 times by weight of water. A coke product is recovered which contained 0.008 weight percent copper.

EXAMPLE XVIII

In the manner of example IX the oxidized cokes of examples VI (presence of water) and VII (absence of water) respectively are each treated with a 1 percent aqueous copper sulfate pentahydrate solution. The cationic solution after filtration and washing with 300 parts of water to 1 part of coke are recovered and the cationic petroleum coke prepared from the oxidized coke of example VI has a wt. % copper of 0.32, 10.1 milliequivalents copper per 100 grams whereas the cationic petroleum coke prepared from the oxidized coke of example VII has a weight percent copper of 0.083, 2.7 milliequivalents of copper per hundred grams of product.

EXAMPLE XIX

The anticaking properties of the cationic petroleum coke is determined with a fertilizer (30 to 60 mesh). The coke is blended with the fertilizer at a concentration of 2.5 wt. % and 5 weight percent respectively and these blends plus the fertilizer are extruded into pellets five-eighth inch by one-half inch. The pellets are stored at about 70° F. approximately 100 percent humidity until hydroscopic water started collecting at the base of the pellet and then dried 17 days in the presence of a desiccant. The crush strength of the pellets is determined to be as follows:

| Cationic Coke wt. % | Wetting and Drying Cycle | Crush Strength |
|---|---|---|
| None | No | 35 |
| None | Yes | 78 |
| 2.5 | Yes | 34.9 |
| 5 | Yes | 30.0 |

The results set forth in example IX through XIX demonstrate the outstanding properties of the micronutrient products of this invention. More particularly examples XII and XVII demonstrate that a cationic petroleum coke product of this invention after treatment with five successive water washes contains 0.70 weight percent copper whereas the same product of example XVII after washing with 35 parts by weight of water contains but 0.008 weight percent. These results demonstrate the ability of the products of this invention to resist leaching from rainfall while providing the necessary slow release of micronutrients to the soil. In addition example XVIII demonstrates that the products of this invention when prepared from a petroleum coke which has been oxidized with oxygen in the presence of water has greater capacity for exchange of metal than a petroleum coke which is oxidized in the absence of water. Thus the products of this invention are capable of providing continuous release of micronutrients over a longer period of time as compared to a product prepared by the oxidation of coke in the absence of water. The results set forth in example XIX clearly demonstrate the anticaking properties which are obtained when the products of this invention are blended into various nitrogen containing fertilizers. More particularly the results in example XIX demonstrate that the crush strength of extruded pellets remains approximately unchanged when subjected to a wet-dry cycle. These results are in sharp contrast to the results obtained when the fertilizer itself in the absence of the products of this invention is subject to a wet-dry cycle. Thus the products of this invention provide for continued release of micronutrients over a long period of time which products resist leaching and when incorporated with a conventional fertilizer impart anticaking properties to such fertilizer micronutrient blend.

Obviously, many modifications and variations of the invention, as hereinafter set forth, may be made without departing from the spirit and scope thereof, and therefore, only such limitations should be imposed as are indicated in the appended claims.

We claim:

1. A product prepared by the process which comprises the steps of (1) oxidizing petroleum coke with oxygen in the presence of water and (2) contacting the product from step (1) or the alkali metal salt thereof with a metal cation selected from the group consisting of copper, iron, magnesium, molybdenum, manganese, zinc, cobalt, ammonium and mixtures thereof.

2. A product of claim 1 wherein the petroleum coke is contacted with air in the oxidation step.

3. A product of claim 2 wherein the water is present in a concentration of from about 0.05 to about 40 by weight in air.

4. A product of claim 1 wherein the petroleum coke contains from about 0 to about 0.5 weight percent moisture from about 1 to about 15 weight percent volatiles, from about 85 to about 95 weight percent fixed carbon, from about 0.2 to about 1.3 weight percent ash and from about 1 to about 5 weight percent sulfur.

5. A product of claim 3 wherein the petroleum coke contains from about 0 to about 0.5 weight percent moisture from about 1 to about 15 weight percent volatiles, from about 85 to about 95 weight percent fixed carbon, from about 0.2 to about 1.3 weight percent ash and from about 1 to about 5 weight percent sulfur.

6. A product of claim 1 wherein the cation is present in a concentration of from about 0.1 to about 2.0 weight percent.

7. A product of claim 2 wherein the cation is present in a concentration of from about 0.1 to about 2.0 weight percent.

8. A product of claim 4 wherein the cation is present in a concentration of from about 0.1 to about 2.0 weight percent.

9. A product of claim 5 wherein the cation is present in a concentration of from about 0.1 to about 1.0 weight percent.

10. A method for supporting crop growth in soil which comprises contacting soil with a micronutrient amount of a product of claim 1.

11. A method for supporting crop growth in soil which comprises contacting soil with a micronutrient amount of a product of claim 2.

12. A method for supporting crop growth in soil which comprises contacting soil with a micronutrient amount of a product of claim 4.

13. A method for supporting crop growth in soil which comprises contacting soil with a micronutrient amount of a product of claim 6.

14. A method for supporting crop growth in soil which comprises contacting soil with a micronutrient amount of a product of claim 7.

15. A method for supporting crop growth in soil which comprises contacting soil with a micronutrient amount of a product of claim 9.